United States Patent
Zhu et al.

(10) Patent No.: US 10,104,532 B2
(45) Date of Patent: Oct. 16, 2018

(54) PROCESSING METHOD AND DEVICE FOR DEVICE TO DEVICE (D2D) DISCOVERY

(71) Applicant: ZTE Corporation, Shenzhen (CN)

(72) Inventors: Jinguo Zhu, Shenzhen (CN); Shuang Liang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/301,456

(22) PCT Filed: Aug. 8, 2014

(86) PCT No.: PCT/CN2014/084029
§ 371 (c)(1),
(2) Date: Oct. 3, 2016

(87) PCT Pub. No.: WO2015/149463
PCT Pub. Date: Oct. 8, 2015

(65) Prior Publication Data
US 2017/0111781 A1    Apr. 20, 2017

(30) Foreign Application Priority Data
Apr. 3, 2014    (CN) .......................... 2014 1 0134559

(51) Int. Cl.
*H04W 8/00* (2009.01)
*H04W 92/18* (2009.01)

(52) U.S. Cl.
CPC ............ *H04W 8/005* (2013.01); *H04W 92/18* (2013.01)

(58) Field of Classification Search
CPC ..... H04W 4/005; H04W 4/008; H04W 8/005; H04W 48/16; H04W 92/18
USPC ........................................ 455/41.2, 518, 519
See application file for complete search history.

(56) References Cited

U.S. PATENT DOCUMENTS

2013/0288645 A1    10/2013  Zheng
2014/0003373 A1*   1/2014   Hakola ................. H04W 48/16
                                                    370/329

FOREIGN PATENT DOCUMENTS

| CN | 102172093 A | 8/2011 |
| CN | 102547984 A | 7/2012 |
| WO | 2013102390 A1 | 7/2013 |
| WO | 20140919618 A1 | 2/2014 |

OTHER PUBLICATIONS

International Search Report for corresponding application PCT/CN2014/084029 filed on Aug. 8, 2014; dated Jan. 16, 2015.
(Continued)

*Primary Examiner* — Raymond Dean
(74) *Attorney, Agent, or Firm* — Cantor Colburn LLP (57) ABSTRACT

A processing method and device for Device to Device (D2D) discovery are provided. The method includes that: a broadcaster terminal acquires a radio resource in a D2D discovery process; and the broadcaster terminal sends a mode indicator and a broadcast identifier through the radio resource, wherein the mode indicator is used for indicating whether a terminal corresponding to the broadcast identifier is the broadcaster terminal or a target terminal which the broadcaster terminal expects to discover. By the solution, flexibility and diversity of a D2D communication mode are enhanced, and user experiences are improved.

12 Claims, 5 Drawing Sheets

(56) References Cited

OTHER PUBLICATIONS

Extended Supplementary European Search Report Application No. EP14888241; dated Feb. 6, 2017; pp. 8.
Intel, et al.: "Discovery for Public Safety", 3rd Generation Partnership Project; vol. SA WG2, XP050770163; Mexico; Date Feb. 17, 2014; pp. 17 Retrieved from the Internet: URL:HTTP://WWW.3GPP.ORG/FTP/Meetings_3GPP_SYNC/SA/SA2/Docs.

* cited by examiner

PROCESSING METHOD AND DEVICE FOR DEVICE TO DEVICE (D2D) DISCOVERY

TECHNICAL FIELD

The present disclosure relates to the field of communication, and in particular to a method and device for D2D discovery.

BACKGROUND

The use of D2D direct communication between terminals in proximity to each other can bring many advantages to the terminals, for example, a higher rate, a shorter delay and lower power consumption. At the same time, the D2D direct communication can greatly improve radio resource efficiency of an operating company, and a D2D relay mode is favorable for improving wireless coverage of the operating company. For applications, new services which are more attractive can be developed by virtue of proximity information in a D2D communication process. A public safety system may also implement communication between terminals under the condition of no wireless coverage by virtue of a D2D technology.

Figure 1:
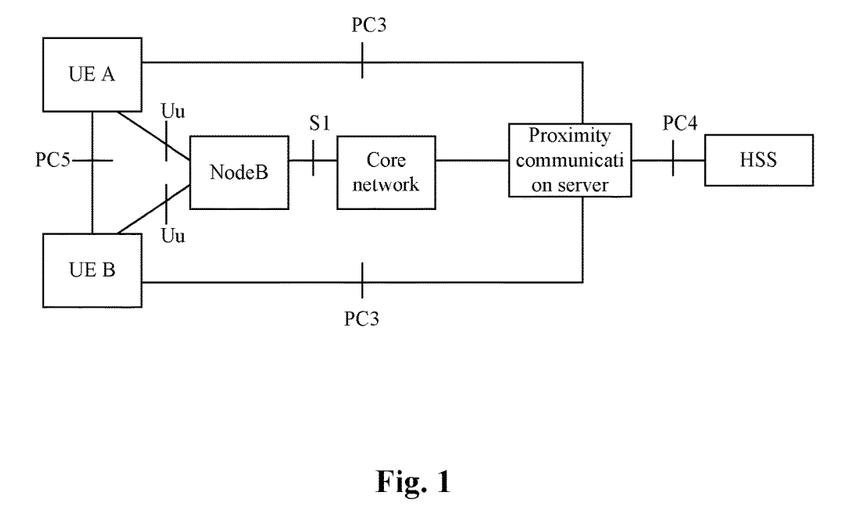
FIG. 1 is a schematic diagram showing the architecture of a 3GPP related D2D network system according to the related technology.

FIG. 1 is a schematic diagram showing the architecture of a 3rd Generation Partnership Project (3GPP) related D2D network system according to a related technology. As shown in FIG. 1, functions of important network elements in the system are described as follows.

Terminal, which is also called User Equipment (UE), supports signal sending and receiving through an interface PC5 between terminals, and also supports wireless access to a NodeB and access to a core network through an S1 interface under existence of coverage, and the terminal communicates with a proximity communication server through a user plane interface PC3.

NodeB, which is also called an Evolved NodeB (eNB) in an evolution system, mainly provides a radio resource for terminal access, and simultaneously intercommunicates with the core network through an S1 interface.

Core network includes a mobility management element and a gateway. The mobility management element is a control plane entity and a server responsible for temporarily storing user data, and is responsible for authentication, mobility management, subscription checking and the like. The gateway is a user plane entity, and is responsible for allocating an Internet Protocol (IP) address to the terminal, forwarding uplink and downlink data packets of the terminal and performing charging and the like.

Proximity communication server is positioned outside the core network, and the terminal communicates with the server through a user plane interface PC3. Main functions of the server include D2D service authorization, allocation of a temporary code to an application requested by the terminal for broadcasting of the terminal, assistance in D2D discovery, charging and the like. The server can acquire authorization information from a Home Subscriber Server (HSS).

HSS is positioned in a home network, and has a main function of providing subscription information and authentication information of a user and the application.

An operating company allocates a unique application ID to an application on a terminal, and for example, the application ID may include Public Land Mobile Network (PLMN) information and application identification information. The PLMN information indicates that the operating company is authorized and the operating company can implement control and charging. The terminal is usually not allowed to directly broadcast its own application ID, and the terminal needs to acquire a temporary code uniquely corresponding to the application ID from a proximity server and then broadcast the code.

Figure 3:
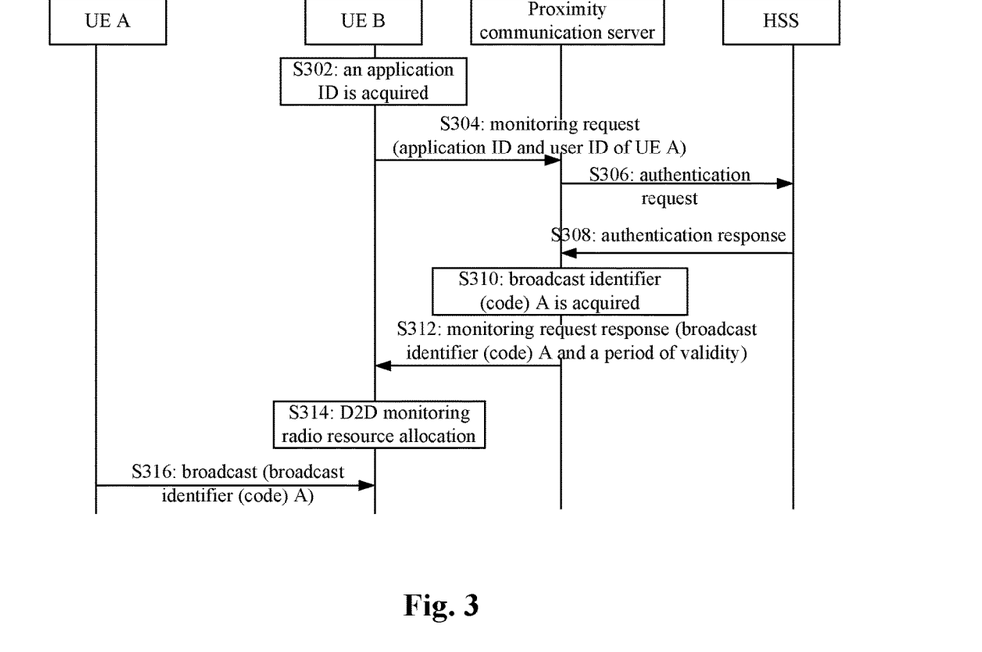
FIG. 3 is a diagram showing a monitoring request process according to the related technology.
Figure 4:
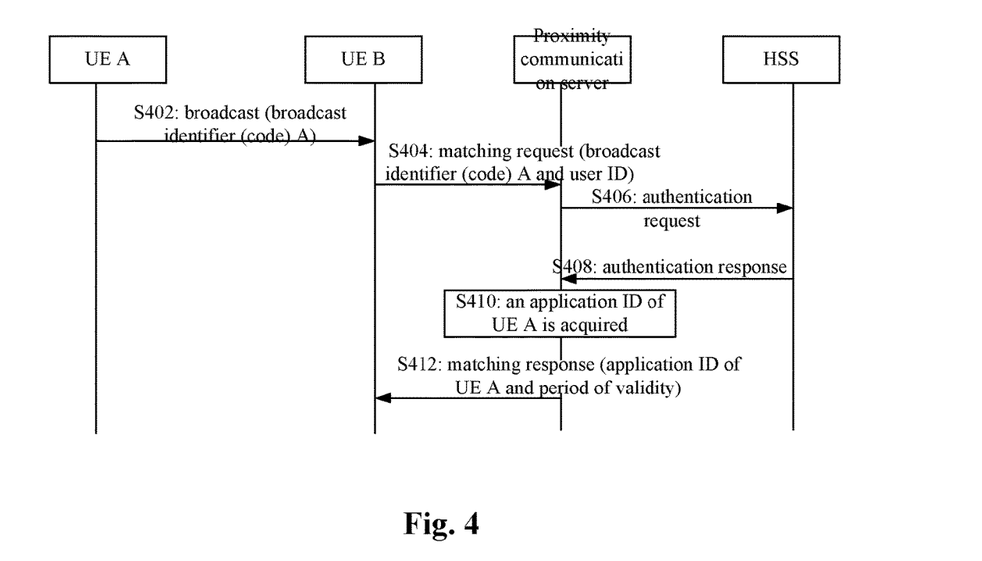
FIG. 4 is a diagram showing a matching request process according to the related technology.

D2D discovery between two terminals includes two processes: broadcasting of UE A and monitoring of UE B. If UE B has known a monitored code A, UE B can directly discover that UE A is in proximity to UE B. If UE B does not know the monitored code A, a network matching process is further required so as to acquire an application ID, corresponding to the code A, of UE A to discover that UE A is in proximity to UE B. Descriptions about the three processes are shown in FIG. 2, FIG. 3 and FIG. 4 respectively.

Figure 2:
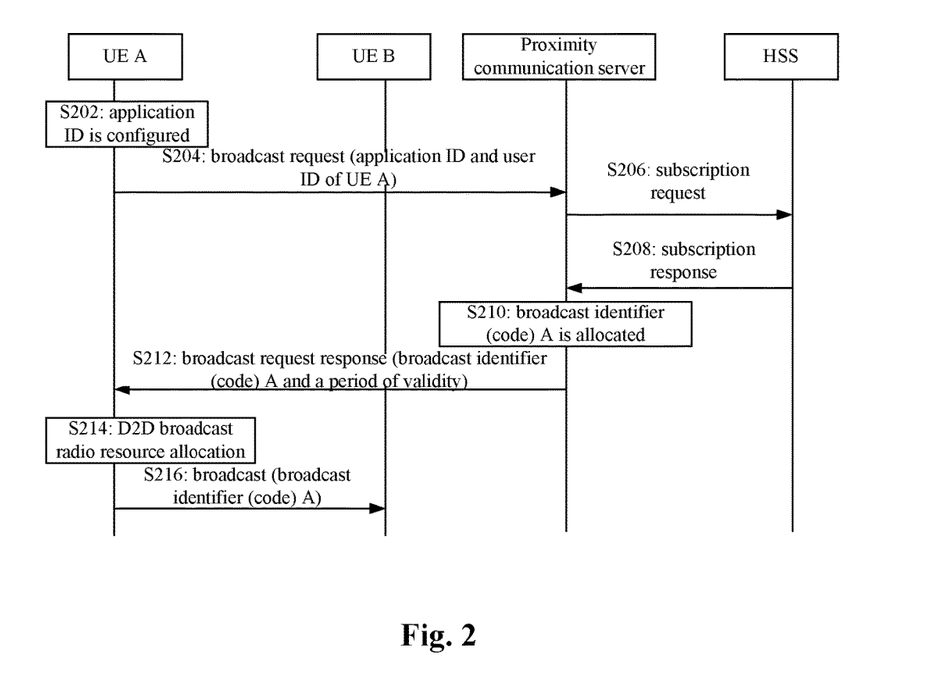
FIG. 2 is a diagram showing a broadcast request process according to the related technology.

FIG. 2 is a diagram showing a broadcast request process according to the related technology. As shown in FIG. 2, the process includes the following steps:

Step S202: UE A acquires an application ID from an operating company, wherein the application ID is uniquely used by UE A.

Step S204: if UE A expects to broadcast itself by virtue of a radio resource of an operating company to enable others to discover UE A, UE A establishes a connection with a network, and sends a broadcast request message to a proximity server, wherein the request message carries an application ID expected to be broadcast, a UE ID and an announcing indication. UE A generates an ID of the proximity server according to its own home PLMN ID, and acquires an IP address of the home proximity server through a Domain Name Server (DNS). The UE ID is an International Mobile Subscriber Identification (IMSI) number or a Mobile Subscriber Integrated Service Digital Network/Public Switched Telephone Network (ISDN/PSTN) number.

Step S206: the proximity server sends a subscription request carrying a user ID to a home server after receiving the broadcast request message, if there is no user context in the proximity server.

Step S208: the home server returns subscription information of the UE in a subscription response.

Step S210: if the home proximity server judges, according to the subscription information, that the UE is allowed to perform a D2D service and a corresponding user indeed subscribes for an application with the sent application ID, then the home proximity server creates a user context, and allocates a temporary broadcast identifier (code A) and a corresponding period of validity to the application ID sent by the user. If considering that UE A may roam to a visited network, the home proximity server also needs to notify the temporary code A to a proximity server of a visited place.

Step S212: the proximity server returns the allocated temporary broadcast identifier (code A) and the corresponding period of validity to UE A.

Step S214: UE A acquires a radio resource. Two manners may be adopted by UE A to acquire the radio resource. In manner 1, radio resources corresponding to each PLMN allowing D2D broadcasting are configured to UE A, and then a D2D radio resource matched with a PLMN where the UE is currently registered can be found when the UE is not under coverage or a NodeB indicates the UE to adopt the manner. In manner 2, the NodeB allocates an available D2D radio resource to UE A.

Step S216: UE A broadcasts the acquired code A on the acquired radio resource. In order to improve efficiency, UE A may set a timer and regularly broadcasts within the period of validity indicated in Step S210.

After the period of validity expires, the broadcast identifier (code A) becomes invalid, and UE A needs to reinitiate a broadcast request process to re-acquire a broadcast identifier (code A) and a period of validity.

FIG. 3 is a diagram showing a monitoring request process according to the related technology. As shown in FIG. 3, the process includes the following steps:

Step S302: UE B acquires an application ID of UE A from an operating company or a third party.

Step S304: if UE B expects to discover UE A, UE B establishes a connection with a network, and sends a monitoring request to a proximity server, wherein the request carries the application ID of UE A which UE B expects to discover and a UE ID of UE B. UE B generates an ID of the proximity server according to its own home PLMN ID, and acquires an IP address of the home proximity server through a DNS. The UE ID may be an IMSI or MSISDN number.

Step S306: the proximity server sends a subscription request carrying a user ID to a home server after receiving a discovery request, if there is no user context in the proximity server.

Step S308: the home server returns subscription information of the UE in a subscription response.

Step S310: if the home proximity server judges that the UE is allowed to perform a D2D service according to the subscription information, then the home proximity server creates a user context.

Step S312: the home proximity server finds a corresponding temporary broadcast identifier (code A) according to the application ID of UE A, and sends the code A and a period of validity set for the code A to UE B. If UE A and UE B do not belong to the same operating company, the home proximity server of the UE B finds a home proximity server of UE A according to the application ID of UE A, and queries from the home proximity server of UE A to acquire the code A.

Step S314: UE B acquires a radio resource. UE B is configured with radio resources corresponding to each PLMN allowing D2D monitoring, and the UE may monitor all these radio resources within the period of validity indicated in Step S306.

Step S316: UE B successfully discovers that UE A is in proximity if UE B discovers the code A through monitoring.

After the period of validity expires, the code A becomes invalid, and UE B needs to reinitiate a monitoring request process to acquire a new code A and period of validity.

If UE A corresponds to a certain type of application in Step S304, a mask may be returned in Step S312, and then if the monitored code in Step S316 is matched with the mask, for example, first few bits of the code are completely matched with the mask, UE B needs to initiate a matching process to acquire an application ID corresponding to the code.

FIG. 4 is a diagram showing a matching request process according to the related technology. As shown in FIG. 4, the process includes the following steps:

Step S402: UE B discovers a code A through monitoring, wherein the code A is matched with a mask, but UE B does not know the code A.

Step S404: UE B establishes a connection with a network, and sends a matching request to a home proximity server, wherein the request carries the discovered code A and a UE ID of UE B. UE B generates a ID of the proximity server through its own home PLMN ID, and acquires an IP address of the home proximity server through a DNS. The UE ID may be an IMSI or MSISDN number.

Step S406: the proximity server sends a subscription request carrying a user ID to a home server after receiving a discovery request, if there is no user context in the proximity server.

Step S408: the home server returns subscription information of the UE in a subscription response.

Step S410: if the home proximity server judges that the UE is allowed to perform a D2D service according to the subscription information, the home proximity server acquires an application ID of UE A according to the code A. If UE A and UE B do not belong to the same operating company, the home proximity server of UE B finds a home proximity server of UE A according to the code A of UE A, and queries from the home proximity server of UE A to acquire an application-layer ID.

Step S412: the home proximity server sets a period of validity of the code A, and returns the application ID of UE A and the period of validity to UE B, and UE B successfully discovers that UE A is in proximity. The code A and the application ID of UE A are matched in the period of validity.

At present, D2D discovery supports only one mode that UE A broadcasts its own code, which, for example, represents that UE A broadcasts "I am here", and other UE can discover UE A after receiving the code. However, such a discovery mode is relatively passive, and a user of UE cannot actively find other UE for D2D communication.

For the problems of simplicity and poor flexibility of a D2D communication mode in the related technology, there is yet no effective solution.

SUMMARY

The embodiments of the present disclosure provide a processing method and device for D2D discovery, so as to at least solve the problems of simplicity and poor flexibility of a D2D communication mode in the related technology.

According to an embodiment of the present disclosure, a processing method for D2D discovery is provided, which may include that: a broadcaster terminal acquires a radio resource in a D2D discovery process; and the broadcaster terminal sends a mode indicator and a broadcast identifier through the radio resource, wherein the mode indicator may be used for indicating whether a terminal corresponding to the broadcast identifier is the broadcaster terminal or a target terminal which the broadcaster terminal expects to discover.

Under a condition that the mode indicator is used for indicating that the terminal corresponding to the broadcast identifier is the broadcaster terminal, the broadcast identifier may include a temporary code, allocated by a network side and matched with a current application ID, of the broadcaster terminal.

Under a condition that the mode indicator is used for indicating that the terminal corresponding to the broadcast identifier is the target terminal, the broadcast identifier may include an application ID of the target terminal.

There may be one or more target terminals.

According to another embodiment of the present disclosure, a processing method for D2D discovery is provided, which may include that: a target terminal receives a mode indicator and a broadcast identifier sent by a broadcaster terminal through a radio resource, wherein the mode indicator may be used for indicating whether a terminal corresponding to the received broadcast identifier is the broadcaster terminal or a target terminal which the broadcaster terminal expects to discover; and the target terminal matches the broadcast identifier according to the mode indicator.

The step that the target terminal matches the broadcast identifier according to the mode indicator may include that: the target terminal judges whether the mode indicator is used for indicating that the terminal corresponding to the broadcast identifier is the broadcaster terminal or the target terminal which the broadcaster terminal expects to discover; and if a judgment result indicates the target terminal which the broadcaster terminal expects to discover, the target terminal matches an application ID of the target terminal with the received broadcast identifier, and sends a mode indicator and a temporary code matched with the application ID of the target terminal through the radio resource under a condition of successful matching, wherein the temporary code belongs to the broadcast identifier and the mode indicator is used for indicating that the terminal corresponding to the broadcast identifier is a broadcaster terminal.

Before the step that the target terminal sends the mode indicator and the temporary code matched with the application ID of the target terminal through the radio resource under the condition of successful matching, the method may further include that: the target terminal requests a network side to allocate the temporary code matched with the application ID of the target terminal.

According to another embodiment of the present disclosure, a processing device for D2D discovery is provided, which may include: an acquisition component, configured to acquire a radio resource in a D2D discovery process; and a sending component, configured to send a mode indicator and a broadcast identifier through the radio resource, wherein the mode indicator may be used for indicating whether a terminal corresponding to the broadcast identifier is a broadcaster terminal or a target terminal which the broadcaster terminal expects to discover.

Under a condition that the mode indicator is used for indicating that the terminal corresponding to the broadcast identifier is the broadcaster terminal, the broadcast identifier may include a temporary code, allocated by a network side and matched with a current application ID, of the broadcaster terminal.

Under a condition that the mode indicator is used for indicating that the terminal corresponding to the broadcast identifier is the target terminal, the broadcast identifier may include an application ID of the target terminal.

There may be one or more target terminals.

According to another embodiment of the present disclosure, a processing device for D2D discovery is provided, which may include: a receiving component, configured to receive a mode indicator and a broadcast identifier sent by a broadcaster terminal through a radio resource, wherein the mode indicator may be used for indicating whether a terminal corresponding to the received broadcast identifier is the broadcaster terminal or a target terminal which the broadcaster terminal expects to discover; and a matching component, configured to match the broadcast identifier according to the mode indicator.

The matching component may include: a judgment element, configured to judge whether the mode indicator is used for indicating that the terminal corresponding to the broadcast identifier is the broadcaster terminal or the target terminal which the broadcaster terminal expects to discover; a matching element, configured to, if a judgment result of the judgment element indicates the target terminal which the broadcaster terminal expects to discover, match an application ID of the target terminal with the received broadcast identifier; and a sending component, configured to send a mode indicator and a temporary code matched with the application ID of the target terminal through the radio resource under a condition of successful matching of the matching element, wherein the temporary code belongs to the broadcast identifier and the mode indicator is used for indicating that the terminal corresponding to the broadcast identifier is a broadcaster terminal.

The matching component may further include: an acquisition element, configured to request a network side to allocate the temporary code matched with the application ID of the target terminal under the condition of successful matching of the matching element.

According to the embodiments of the present disclosure, a broadcaster terminal acquires a radio resource in a D2D discovery process; and the broadcaster terminal sends a mode indicator and a broadcast identifier through the radio resource, wherein the mode indicator is used for indicating whether a terminal corresponding to the broadcast identifier is the broadcaster terminal or a target terminal which the broadcaster terminal expects to discover, so that the problems of simplicity and poor flexibility of the D2D communication mode in the related technology are solved, flexibility and diversity of the D2D communication mode are enhanced, and user experiences are improved.

BRIEF DESCRIPTION OF THE DRAWINGS

The drawings described here are adopted to provide further understanding of the present disclosure, and form a part of the present disclosure. Schematic embodiments of the present disclosure and descriptions thereof are adopted to explain the present disclosure and not intended to form improper limits to the present disclosure. In the drawings.

DETAILED DESCRIPTION OF THE EMBODIMENTS

D2D discovery in the embodiments of the present disclosure supports at least two modes. Mode 1 is that UE A broadcasts its own code, which, for example, represents that UE A broadcasts "I am here", and other UE can discover UE A after receiving broadcast. Mode 2 is that UE A needs to discover whether there are interested objects or not in proximity, for example, "Who is there" or "Is UE B there" may be broadcast, and other UE may give responses after receiving broadcast. At present, a solution in the related technology may support mode 1 only, and does not support mode 2. In the embodiments of the present disclosure, the original solution is extended to support discovery in mode 2 and other modes.

Figure 5:
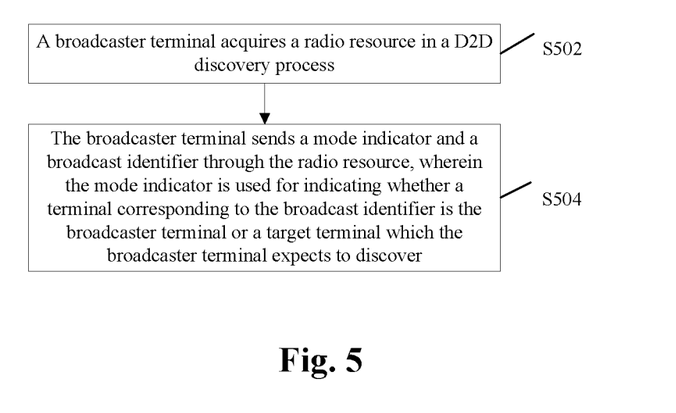
FIG. 5 is a flowchart of a first processing method for D2D discovery according to an embodiment of the present disclosure.

In the embodiment, a processing method for D2D discovery is provided. FIG. 5 is a flowchart of a first processing method for D2D discovery according to an embodiment of the present disclosure. As shown in FIG. 5, the method includes the following steps:

Step S502: a broadcaster terminal acquires a radio resource in a D2D discovery process; and Step S504: the broadcaster terminal sends a mode indicator and a broadcast identifier through the radio resource, wherein the mode indicator is used for indicating whether a terminal corresponding to the broadcast identifier is the broadcaster terminal or a target terminal which the broadcaster terminal expects to discover.

According to the embodiment, the broadcaster terminal adds the mode indicator in a D2D discovery broadcast process, and then a receiver can judge whether the broadcast identifier sent by the broadcaster terminal belongs to the broadcaster terminal or a target terminal which the broadcaster terminal expects to discover according to the mode indicator, so that a technical basis is provided for the broadcaster terminal to actively find another terminal for D2D discovery. The problems of simplicity and poor flexibility of a D2D communication mode in the related technology are solved, flexibility and diversity of the D2D communication mode are enhanced, and user experiences are improved.

As an exemplary implementation mode, under a condition that the mode indicator is used for indicating that the terminal corresponding to the broadcast identifier is the broadcaster terminal, the broadcast identifier may include a temporary code, allocated by a network side and matched with a current application ID, of the broadcaster terminal. As another exemplary implementation mode, under a condition that the mode indicator is used for indicating that the terminal corresponding to the broadcast identifier is the target terminal, the broadcast identifier may include an application ID of the target terminal. For example, under a condition that the broadcaster terminal is UE A and the target terminal is UE B, when the mode indicator sent by UE A indicates that the broadcast identifier corresponds to UE A itself (mode 1 is adopted for indicating such a mode in the embodiments of the present disclosure), the broadcast identifier may include code A allocated by the network side and matched with the current application ID. When the mode indicator sent by UE A indicates that the broadcast identifier corresponds to the target terminal (mode 2 is adopted for indicating such a mode in the embodiments of the present disclosure), the broadcast identifier may include the application ID of the target terminal.

In an exemplary embodiment, there may be one or more target terminals. For example, the application ID of the target terminal may specify one terminal, and may also specify a certain type of terminals. In such a manner, activity and flexibility of D2D discovery of the broadcaster terminal can further be enhanced.

Figure 6:
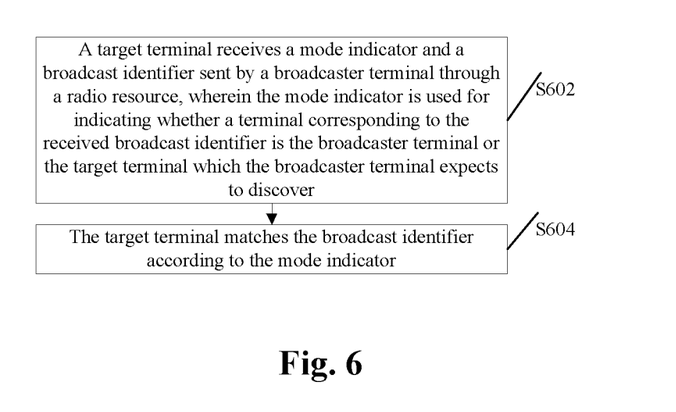
FIG. 6 is a flowchart of a second processing method for D2D discovery according to an embodiment of the present disclosure.

In the embodiment, another processing method for D2D discovery may be further provided. FIG. 6 is a flowchart of a second processing method for D2D discovery according to an embodiment of the present disclosure. As shown in FIG. 6, the method includes the following steps:

Step S602: a target terminal receives a mode indicator and a broadcast identifier sent by a broadcaster terminal through a radio resource, wherein the mode indicator is used for indicating whether a terminal corresponding to the received broadcast identifier is the broadcaster terminal or a target terminal which the broadcaster terminal expects to discover; and Step S604: the target terminal matches the broadcast identifier according to the mode indicator.

According to the embodiment, the target terminal on a receiving side receives the mode indicator sent by the broadcaster terminal in a D2D discovery broadcast process, judges whether the broadcast identifier sent by the broadcaster terminal belongs to the broadcaster terminal or the target terminal which the broadcaster terminal expects to discover according to the mode indicator, and then executes a corresponding matching process according to the judgment result. By virtue of the technical solution, a technical basis is provided for the broadcaster terminal to actively find another terminal for D2D discovery, the problems of simplicity and poor flexibility of a D2D communication mode in the related technology are solved, flexibility and diversity of the D2D communication mode are enhanced, and user experiences are improved.

As an exemplary implementation mode, the following manner may be adopted for the target terminal to match the broadcast identifier according to the mode indicator. The target terminal judges whether the mode indicator is used for indicating that the terminal corresponding to the broadcast identifier is the broadcaster terminal or the target terminal which the broadcaster terminal expects to discover. If a judgment result indicates the target terminal which the broadcaster terminal expects to discover, the target terminal matches an application ID of the target terminal with the received broadcast identifier, and sends a mode indicator and a temporary code matched with the application ID of the target terminal through the radio resource under a condition of successful matching, wherein the temporary code belongs to a type of the broadcast identifier (as mentioned before, if the mode indicator indicates that the terminal corresponding to the broadcast identifier is the broadcaster terminal, the broadcast identifier may be a temporary code of the broadcaster terminal; and if the mode indicator indicates that the terminal corresponding to the broadcast identifier is the target terminal, the broadcast identifier may be the application ID of the target terminal). If the judgment result indicates that the terminal corresponding to the broadcast identifier is the broadcaster terminal, processing is performed according to a matching process in the related technology.

For example, under a condition that a broadcaster terminal is UE A and a target terminal is UE B, when UE B judges that the mode indicator sent by UE A indicates that the broadcast identifier corresponds to UE A (mode 1 is adopted for indicating such a mode in the embodiments of the present disclosure), UE B performs processing according to the matching process in the related technology, that is, discovery is implemented according to a discovery process shown in FIG. 3; and when UE B judges that the mode indicator sent by UE A indicates that the broadcast identifier corresponds to UE B (mode 2 is adopted for indicating such a mode in the embodiments of the present disclosure), UE B matches an application ID of the target terminal with the received broadcast identifier, and sends the temporary code B matched with the application ID of the target terminal under the condition of successful matching. The temporary code B may be sent by broadcasting, and may also be directly sent to UE A in a unicast manner. In an exemplary embodiment, when the target terminal sends its own broadcast identifier through the radio resource under the condition of successful matching, since the target terminal becomes a sending party, a mode indicator used for indicating that the terminal corresponding to the broadcast identifier is a broadcaster terminal may also be sent together when the broadcast identifier is sent. For example, after UE B receives broadcast identifier (code) B sent by UE A and the matching is performed successfully, UE B may send code B to UE A in a broadcasting or unicast manner, and sends a mode indicator which is mode 1 together.

In an exemplary embodiment, before the target terminal sends the mode indicator and the temporary code matched with the application ID of the target terminal through the radio resource under the condition of successful matching, the target terminal may further request a network side to allocate the temporary code matched with the application ID of the target terminal, if the temporary code has not been acquired.

In the embodiment, a first processing device for D2D discovery corresponding to the first processing method is provided, the device is configured to implement the above-mentioned embodiment and exemplary implementation mode, and what has been described will not be elaborated. For example, term "component", used below, may implement a combination of software and/or hardware with a preset function. Although the device described in the following embodiment is preferably implemented with software, implementation with hardware or a combination of software and hardware is also possible and conceivable.

Figure 7:
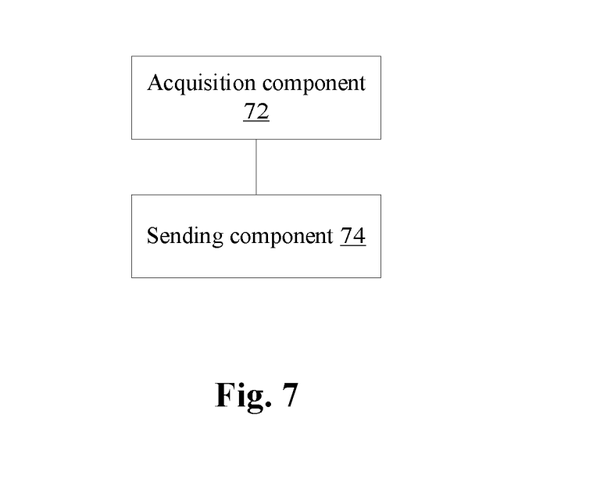
FIG. 7 is a structure block diagram of a first processing device for D2D discovery according to an embodiment of the present disclosure.

FIG. 7 is a structure block diagram of a first processing device for D2D discovery according to an embodiment of the present disclosure. As shown in FIG. 7, the processing device includes: an acquisition component 72 and a sending component 74. Each component will be described below in detail.

The acquisition component 72 is configured to acquire a radio resource in a D2D discovery process; and the sending component 74 is coupled with the acquisition component 72, and is configured to send a mode indicator and a broadcast identifier through the radio resource acquired by the acquisition component 72, wherein the mode indicator is used for indicating whether a terminal corresponding to the broadcast identifier is a broadcaster terminal or a target terminal which the broadcaster terminal expects to discover.

In an exemplary embodiment, under a condition that the mode indicator is used for indicating that the terminal corresponding to the broadcast identifier is the broadcaster terminal, the broadcast identifier may include a temporary code, allocated by a network side and matched with a current application ID, of the broadcaster terminal; and under a condition that the mode indicator is used for indicating that the terminal corresponding to the broadcast identifier is the target terminal, the broadcast identifier may include an application ID of the target terminal. There may be one or more target terminals.

In the embodiment, a second processing device for D2D discovery corresponding to the second processing method is provided, the device is configured to implement the above-mentioned embodiment and exemplary implementation mode, and that what has been described will not be elaborated. For example, term "component", used below, may implement a combination of software and/or hardware with a preset function. Although the device described in the following embodiment is preferably implemented with software, implementation with hardware or a combination of software and hardware is also possible and conceivable.

Figure 8:
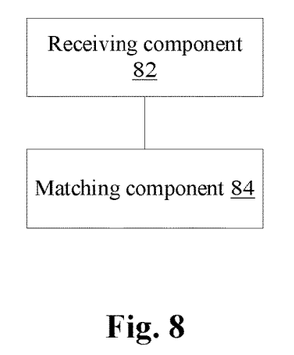
FIG. 8 is a structure block diagram of a second processing device for D2D discovery according to an embodiment of the present disclosure.

FIG. 8 is a structure block diagram of a second processing device for D2D discovery according to an embodiment of the present disclosure. As shown in FIG. 8, the processing device includes: a receiving component 82 and a matching component 84. Each component will be described below in detail.

The receiving component 82 is configured to receive a mode indicator and a broadcast identifier sent by a broadcaster terminal through a radio resource, wherein the mode indicator is used for indicating whether a terminal corresponding to the received broadcast identifier is the broadcaster terminal or a target terminal which the broadcaster terminal expects to discover; and the matching component 84 is coupled with the receiving component 82, and is configured to match the broadcast identifier according to the mode indicator received by the receiving component 82.

In an exemplary embodiment, the matching component 84 may include: a judgment element 842, configured to judge whether the mode indicator is used for indicating that the terminal corresponding to the broadcast identifier is the broadcaster terminal or the target terminal which the broadcaster terminal expects to discover; a matching element 844, coupled with the judgment element 842 and configured to, if a judgment result of the judgment element 842 indicates the target terminal which the broadcaster terminal expects to discover, match an application ID of the target terminal with the received broadcast identifier; and a sending component 846, coupled with the matching element 844 and configured to send a mode indicator and a temporary code matched with the application ID of the target terminal through the radio resource under a condition of successful matching of the matching element 844, wherein the temporary code belongs to a broadcast identifier (as mentioned before, if the mode indicator indicates that the terminal corresponding to the broadcast identifier is the broadcaster terminal, the broadcast identifier may be a temporary code of the broadcaster terminal; and if the mode indicator indicates that the terminal corresponding to the broadcast identifier is the target terminal, the broadcast identifier may be the application ID of the target terminal), wherein the mode indicator indicates that the terminal corresponding to the broadcast identifier is the broadcaster terminal.

In an exemplary embodiment, the matching component 84 may further include: an acquisition element 848, coupled with the matching element 844 and configured to request a network side to allocate the temporary code matched with the application ID of the target terminal if the target terminal has not acquired the temporary code matched with the application ID of the target terminal from a network under the condition of successful matching of the matching element 844.

The present disclosure will be described below with reference to the drawings and embodiments in detail. It is important to note that embodiments in the present disclosure and characteristics in the embodiments may be combined under the condition of no conflicts.

A terminal discovery solution is provided in the following exemplary embodiments, and the solution implements discovery between terminals by virtue of a direct interface between the terminals.

A method of the exemplary embodiment will be described below with reference to the drawings in detail.

Figure 9:
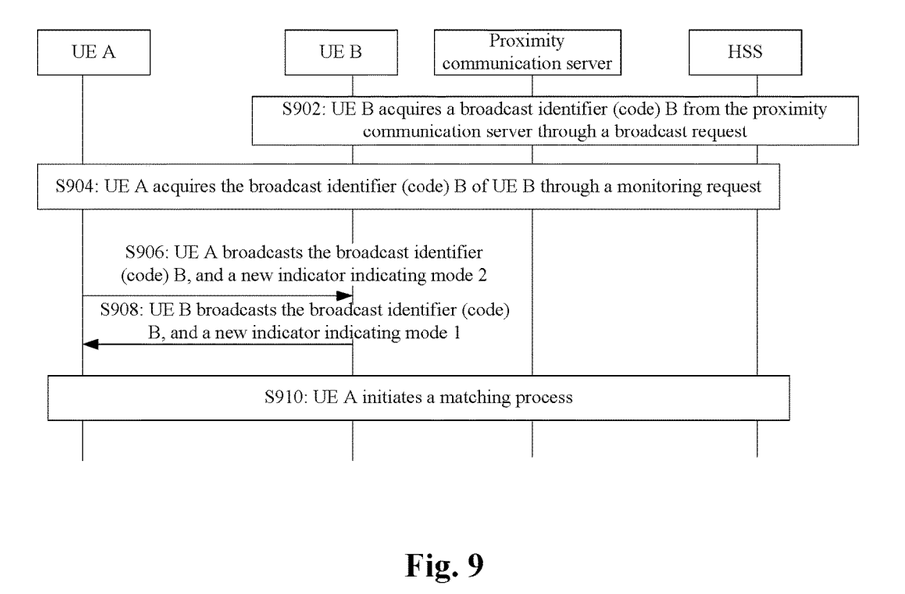
FIG. 9 is a diagram of implementing a mode-2-based discovery process by UE A under a condition that UE B has acquired code B according to an exemplary embodiment of the present disclosure.

FIG. 9 is a diagram of implementing a mode-2-based discovery process by UE A under a condition that UE B has acquired code B according to an exemplary embodiment of the present disclosure.

Step S902: UE B acquires code B from a home proximity server by a broadcast request process shown in FIG. 2, and UE B also performs monitoring on an allowed resource, an acquisition process of a monitoring resource being the same as Step S314.

Step S904: UE A acquires code B of UE B from the home proximity server by a monitoring request process shown in FIG. 3 when UE A expects to discover whether UE B is in proximity or not. As shown in FIG. 2, UE A starts monitoring code B of UE B, and in case of a success, UE A discovers UE B. In case of a failure, for example, code B is still not received after timeout of a timer, Step S906 is executed.

Step S906: UE A applies for a broadcast resource from a network, and broadcasts code B of UE B together with a new indicator indicating that the broadcast mode is mode 2 or indicating that the code contained in the broadcast is the code of target UE. A process of applying for the broadcast resource is consistent with Step S214. UE A simultaneously applies for the monitoring resource by virtue of the process consistent with Step S314.

Step S908: after monitoring the broadcast, UE B determines that it is mode-2-based discovery and UE A broadcasts the code of the target UE according to the new mode indicator which is contained, then UE B judges whether code B is matched with its own code B or not, and directly discards code B if code B is not matched with its own code, and if code B is matched with its own code, UE B broadcasts its own code B with a mode indicator indicating that the broadcast mode is mode 1 or indicating that the code contained in the broadcast is its own code. The process of applying for the broadcast resource is consistent with Step S214.

Step S910: after monitoring the broadcast, UE A determines that it is mode-1-based discovery according to the mode indicator, which indicates that the received code is the code of the broadcast source, and since UE A has known that the code corresponds to UE B, UE B is discovered to be in proximity to UE A.

Figure 10:
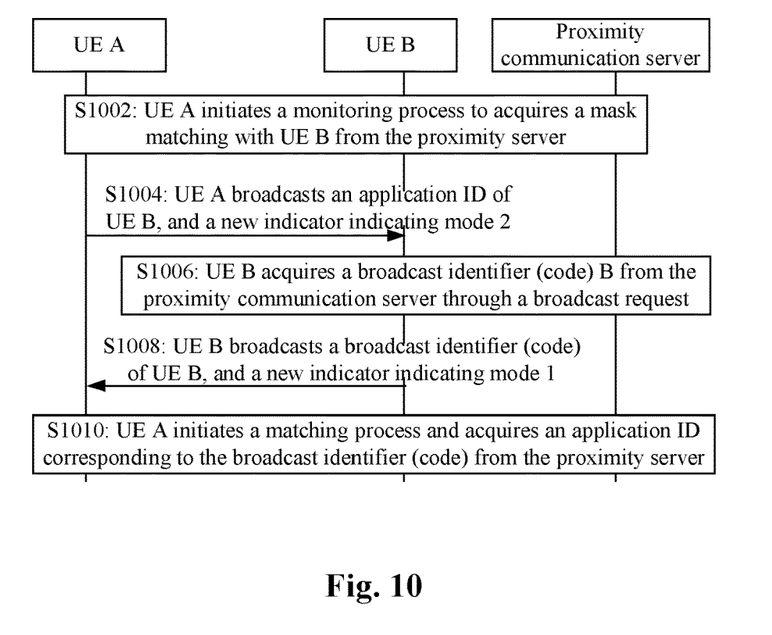
FIG. 10 is a diagram of implementing a mode-2-based discovery process by UE A under a condition that UE B has yet not acquired code B according to an exemplary embodiment of the present disclosure.

FIG. 10 is a diagram of implementing a mode-2-based discovery process by UE A under a condition that UE B has yet not acquired code B according to an exemplary embodiment of the present disclosure.

Step S1002: when UE A expects to discover whether UE B is in proximity to UE A or not, UE A initiates a monitoring request process shown in FIG. 3, but acquires from a home proximity server of UE B a universal mask matching with UE B, based on which UE A can match a received code. If UE A and UE B belong to different PLMNs, communication between proximity servers of two PLMNs is also required in the process. Step S1004: UE A applies for a broadcast resource from a network, and broadcasts an application ID of UE B together with a new mode indicator, indicating that the broadcast mode is mode 2 or indicating that the ID contained in the broadcast is an ID of target UE. A process of applying for the broadcast resource is consistent with Step S214. UE A simultaneously applies for a monitoring resource by virtue of a process consistent with Step S314.

Step S1006: after UE B has monitored the broadcast, UE B determines that it is mode-2-based discovery and UE A broadcasts the ID of the target UE according to the new mode indicator which is contained, then UE B judges whether the ID is matched with its own ID or not, and directly discards the ID if the ID is not matched with its own ID, and if the ID is matched with its own ID, when an available code B has been allocated from the network, Step S1008 is directly executed, otherwise UE B applies for corresponding code B from the home proximity server by a broadcast request process shown in FIG. 2.

Step S1008: UE B broadcasts the allocated code B together with a new mode indicator, indicating that the broadcast mode is mode 1 or indicating that its own code is contained in the broadcast. The process of applying for the broadcast resource is consistent with Step S214.

Step S1010: after monitoring the broadcast, UE A determines that it is mode-1-based discovery according to the mode indicator, which indicates that the code of the broadcast source is received, UE A judges whether the received code is matched with the mask acquired in Step S1002 or not, and directly discards the code if the received code is not matched with the mask, and if the received code is matched with the mask, because UE A does not know the terminal corresponding to the code, it is needed to initiate a matching request process shown in FIG. 4 to acquire an application ID of UE B corresponding to the code to discover that UE B is in proximity to UE A.

Figure 11:
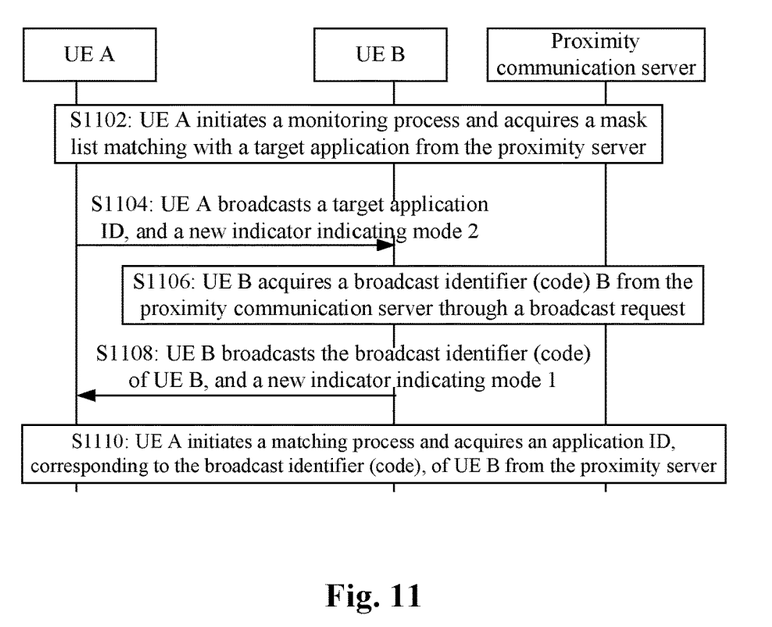
FIG. 11 is a diagram of a condition that targets which the broadcaster terminal expects to discover by UE A are users of a certain type of application in proximity according to an exemplary embodiment of the present disclosure.

FIG. 11 is a diagram of a condition that targets which UE A expects to discover are users of a certain type of application in proximity according to an exemplary embodiment of the present disclosure. There may be multiple users of the applications of this type, and UE B is one of the users.

Step S1102: when UE A expects to discover a user of a certain type of application, UE A initiates a monitoring request process shown in FIG. 3. In the process, a home proximity server of UE A judges that monitoring targets are multiple users of a certain type of application, knows all PLMNs allowed to be monitored by the users according to subscription, requests proximity servers of these PLMNs to allocate masks corresponding to the application, and returns a mask list formed by the acquired mask corresponding to each PLMN and a mask which is allocated by the home proximity server of UE A and corresponds to the target application to UE A, so that UE A can match a monitored code.

Step S1104: UE A applies for a broadcast resource from a network and broadcasts a target application ID together with a new mode indicator, indicating that the broadcast is mode 2 or indicating that the target application ID is contained in the broadcast. A process of applying for the broadcast resource is consistent with Step S214. UE A simultaneously applies for a monitoring resource by virtue of a process consistent with Step S314.

Step S1106: after monitoring the broadcast, UE B determines that it is mode-2-based discovery and UE A broadcasts an ID of target UE according to the new mode indicator which is contained, then UE B judges whether the ID is matched with its own ID or not, and directly discards the ID if the ID is not matched with its own ID, and if the ID is matched with its own ID, when an available code B has been allocated from the network, and Step S1108 is directly executed, otherwise UE B applies for corresponding code B from the home proximity server by a broadcast request process shown in FIG. 2.

Step S1108: UE B broadcasts the allocated code B together with a new mode indicator, indicating that the broadcast is mode 1 or indicating that its own code is contained in the broadcast. The process of applying for the broadcast resource is consistent with Step S214.

Step S1110: UE A monitors the broadcast on radio resources configured in each allowed PLMN according to configured information. If the received broadcast contains a code and a mode indicator, UE A determines that it is mode-1-based discovery according to the mode indicator, which indicates that its own code of the broadcast source is received, UE A judges whether the received code is matched with the mask, acquired in Step S1102, corresponding to the PLMN or not, and directly discards the code if the received code is not matched with the mask, and if the received code is matched with the mask, because UE A does not know the terminal corresponding to the code, it is needed to initiate a matching request process shown in FIG. 4 to acquire an application ID of UE B corresponding to the code to discover that UE B is in proximity to UE A.

In each of the abovementioned flows, it is supposed that UE A and UE B are positioned in the same home network. By adding a message between the home proximity servers, the solution in the embodiment may also be applicable to a discovery scenario where two terminals belong to different networks.

In another embodiment, software is further provided, which is configured to execute the technical solutions described in the abovementioned embodiments and exemplary embodiments.

In another embodiment, a storage medium is further provided, in which the abovementioned software is stored, the storage medium including, but not limited to, a compact disc, a floppy disk, a hard disk, an erasable memory and the like.

Obviously, those skilled in the art should know that each component of each component or step of the present disclosure may be implemented by a universal computing device, and the components or steps may be concentrated on a single computing device or distributed on a network formed by a plurality of computing devices, and may optionally be implemented by programmable codes executable for the computing devices, so that the components or steps may be stored in a storage device for execution with the computing devices, the shown or described steps may be executed in sequences different from those described here in some circumstances, or may form each integrated circuit component respectively, or multiple components or steps therein may form a single integrated circuit component for implementation. As a consequence, the present disclosure is not limited to any specific hardware and software combination.

The above is only the exemplary embodiment of the present disclosure and not intended to limit the present disclosure, and for those skilled in the art, the present disclosure may have various modifications and variations. Any modifications, equivalent replacements, improvements and the like within the principle of the present disclosure shall fall within the scope of protection defined by the appended claims of the present disclosure.

INDUSTRIAL APPLICABILITY

As mentioned above, the processing method for D2D discovery and device provided by the embodiments of the present disclosure have the following beneficial effects: the flexibility and diversity of the D2D communication mode are enhanced, and user experiences are improved.

What is claimed is:
1. A processing method for Device to Device (D2D) discovery, comprising:
acquiring, by a broadcaster terminal, a radio resource in a D2D discovery process; and
sending, by the broadcaster terminal, a mode indicator and a broadcast identifier through the radio resource, wherein the mode indicator is used for indicating whether a terminal corresponding to the broadcast identifier is the broadcaster terminal or a target terminal which the broadcaster terminal expects to discover;
wherein, under a condition that the mode indicator is used for indicating that the terminal corresponding to the broadcast identifier is the target terminal, the broadcast identifier comprises an application ID of the target terminal.

2. The method as claimed in claim 1, wherein, under a condition that the mode indicator is used for indicating that the terminal corresponding to the broadcast identifier is the broadcaster terminal, the broadcast identifier comprises a temporary code, allocated by a network side and matched with a current application ID, of the broadcaster terminal.

3. The method as claimed in claim 1, wherein there are one or more target terminals.

4. A processing method for Device to Device (D2D) discovery, comprising:
receiving, by a target terminal, a mode indicator and a broadcast identifier sent by a broadcaster terminal through a radio resource, wherein the mode indicator is used for indicating whether a terminal corresponding to the received broadcast identifier is the broadcaster terminal or a target terminal which the broadcaster terminal expects to discover; and
matching, by the target terminal, the broadcast identifier according to the mode indicator;
wherein, under a condition that the mode indicator is used for indicating that the terminal corresponding to the broadcast identifier is the target terminal, the broadcast identifier comprises an application ID of the target terminal.

5. The method as claimed in claim 4, wherein matching, by the target terminal, the broadcast identifier according to the mode indicator comprises:
judging, by the target terminal, whether the mode indicator is used for indicating that the terminal corresponding to the broadcast identifier is the broadcaster terminal or the target terminal which the broadcaster terminal expects to discover; and
if a judgment result indicates the target terminal which the broadcaster terminal expects to discover, matching, by the target terminal, the application ID of the target terminal with the received broadcast identifier, and sending, by the target terminal, a mode indicator and a temporary code matched with the application ID of the target terminal through the radio resource under a condition of successful matching, wherein the temporary code belongs to the broadcast identifier and the mode indicator is used for indicating that the terminal corresponding to the broadcast identifier is a broadcaster terminal.

6. The method as claimed in claim 4, before sending, by the target terminal, the mode indicator and the temporary code matched with the application ID of the target terminal through the radio resource under the condition of successful matching, further comprising:
requesting, by the target terminal, a network side to allocate the temporary code matched with the application ID of the target terminal.

7. A processing device for Device to Device (D2D) discovery, comprising:

an acquisition component, configured to acquire a radio resource in a D2D discovery process; and a sending component, configured to send a mode indicator and a broadcast identifier through the radio resource, wherein the mode indicator is used for indicating whether a terminal corresponding to the broadcast identifier is a broadcaster terminal or a target terminal which the broadcaster terminal expects to discover;

wherein, under a condition that the mode indicator is used for indicating that the terminal corresponding to the broadcast identifier is the target terminal, the broadcast identifier comprises an application ID of the target terminal.

8. The device as claimed in claim 7, wherein, under a condition that the mode indicator is used for indicating that the terminal corresponding to the broadcast identifier is the broadcaster terminal, the broadcast identifier comprises a temporary code, allocated by a network side and matched with a current application ID, of the broadcaster terminal.

9. The device as claimed in claim 7, wherein there are one or more target terminals.

10. A processing device for Device to Device (D2D) discovery, comprising:

a receiving component, configured to receive a mode indicator and a broadcast identifier sent by a broadcaster terminal through a radio resource, wherein the mode indicator is used for indicating whether a terminal corresponding to the received broadcast identifier is the broadcaster terminal or a target terminal which the broadcaster terminal expects to discover; and a matching component, configured to match the broadcast identifier according to the mode indicator;

wherein, under a condition that the mode indicator is used for indicating that the terminal corresponding to the broadcast identifier is the target terminal, the broadcast identifier comprises an application ID of the target terminal.

11. The device as claimed in claim 10, wherein the matching component comprises:

a judgment element, configured to judge whether the mode indicator is used for indicating that the terminal corresponding to the broadcast identifier is the broadcaster terminal or the target terminal which the broadcaster terminal expects to discover;

a matching element, configured to, if a judgment result of the judgment element indicates the target terminal which the broadcaster terminal expects to discover, match the application ID of the target terminal with the received broadcast identifier; and a sending component, configured to send a mode indicator and a temporary code matched with the application ID of the target terminal through the radio resource under a condition of successful matching of the matching element, wherein the temporary code belongs to the broadcast identifier and the mode indicator is used for indicating that the terminal corresponding to the broadcast identifier is a broadcaster terminal.

12. The device as claimed in claim 11, wherein the matching component further comprises:

an acquisition element, configured to request a network side to allocate the temporary code matched with the application ID of the target terminal under the condition of successful matching of the matching element.

* * * * *